United States Patent
Gerding

(10) Patent No.: US 7,198,436 B2
(45) Date of Patent: Apr. 3, 2007

(54) MULTI-BLADE ROUTER TOOL, EDGER WITH MULTI-BLADE ROUTER TOOL, AND METHOD OF EDGING EYEGLASS LENSES

(75) Inventor: David W. Gerding, Barboursville, VA (US)

(73) Assignee: National Optronics, Inc., Charlottesville, VA (US)

( * ) Notice: Subject to any disclaimer, the term of this patent is extended or adjusted under 35 U.S.C. 154(b) by 0 days.

(21) Appl. No.: 10/963,740

(22) Filed: Oct. 14, 2004

(65) Prior Publication Data

US 2006/0083596 A1  Apr. 20, 2006

(51) Int. Cl.
*B23C 5/02* (2006.01)
*B23C 5/12* (2006.01)

(52) U.S. Cl. .................. 407/60; 407/40; 407/41; 407/47; 407/49; 407/61

(58) Field of Classification Search ............ 407/40–41, 407/47, 49, 60–61
See application file for complete search history.

(56) References Cited

U.S. PATENT DOCUMENTS

| | | | | |
|---|---|---|---|---|
| 959,328 | A | * | 5/1910 | Eynon ..................... 407/47 |
| 2,630,725 | A | * | 3/1953 | Black ..................... 408/224 |
| 3,946,474 | A | * | 3/1976 | Hahn et al. .............. 407/37 |
| 4,171,926 | A | * | 10/1979 | Dusza .................... 407/52 |
| 4,505,626 | A | * | 3/1985 | Benhase ................. 408/224 |
| 4,531,867 | A | * | 7/1985 | Benhase ................. 408/229 |
| 4,841,676 | A | * | 6/1989 | Barwasser ............... 451/461 |
| 5,173,013 | A | * | 12/1992 | Gorse et al. ............. 408/22 |
| 5,288,184 | A | * | 2/1994 | Heule .................... 408/224 |
| 5,626,511 | A | * | 5/1997 | Kennedy et al. ........ 451/461 |
| 5,816,753 | A | * | 10/1998 | Hall ...................... 408/224 |
| 5,857,506 | A | * | 1/1999 | Paolone ................. 144/230 |
| 5,957,633 | A | * | 9/1999 | Hall ...................... 408/187 |
| 6,203,409 | B1 | | 3/2001 | Kennedy et al. |
| 6,644,369 | B1 | * | 11/2003 | Chiang .................. 144/230 |
| 6,984,094 | B2 | * | 1/2006 | Nuzzi et al. ............ 408/224 |
| 7,044,692 | B2 | * | 5/2006 | Weise et al. ............ 409/74 |
| 2003/0138301 | A1 | * | 7/2003 | Kuerzel ................. 407/34 |
| 2004/0178528 | A1 | | 9/2004 | Diehl et al. |

FOREIGN PATENT DOCUMENTS

JP          03196915 A   *   8/1991

* cited by examiner

*Primary Examiner*—Monica Carter
*Assistant Examiner*—Eric A. Gates
(74) *Attorney, Agent, or Firm*—Berenato, White & Stavish, LLC

(57) ABSTRACT

The present invention relates to a router tool for edging the peripheral edge of eyeglass lenses. The tool comprises a longitudinally extending body rotatable on the axis thereof. A first blade extends axially and radially from the body, and has a first cutting portion for shaping an edge of a lens to a first configuration. A second blade is provided that is axially spaced from the first blade. The second blade extends axially and radially from the body, and has a second cutting portion for shaping an edge of a lens to a second configuration different than the first configuration. The present invention also relates to an edger having the disclosed router tool, and a method for shaping the edge of eyeglass lenses.

26 Claims, 8 Drawing Sheets

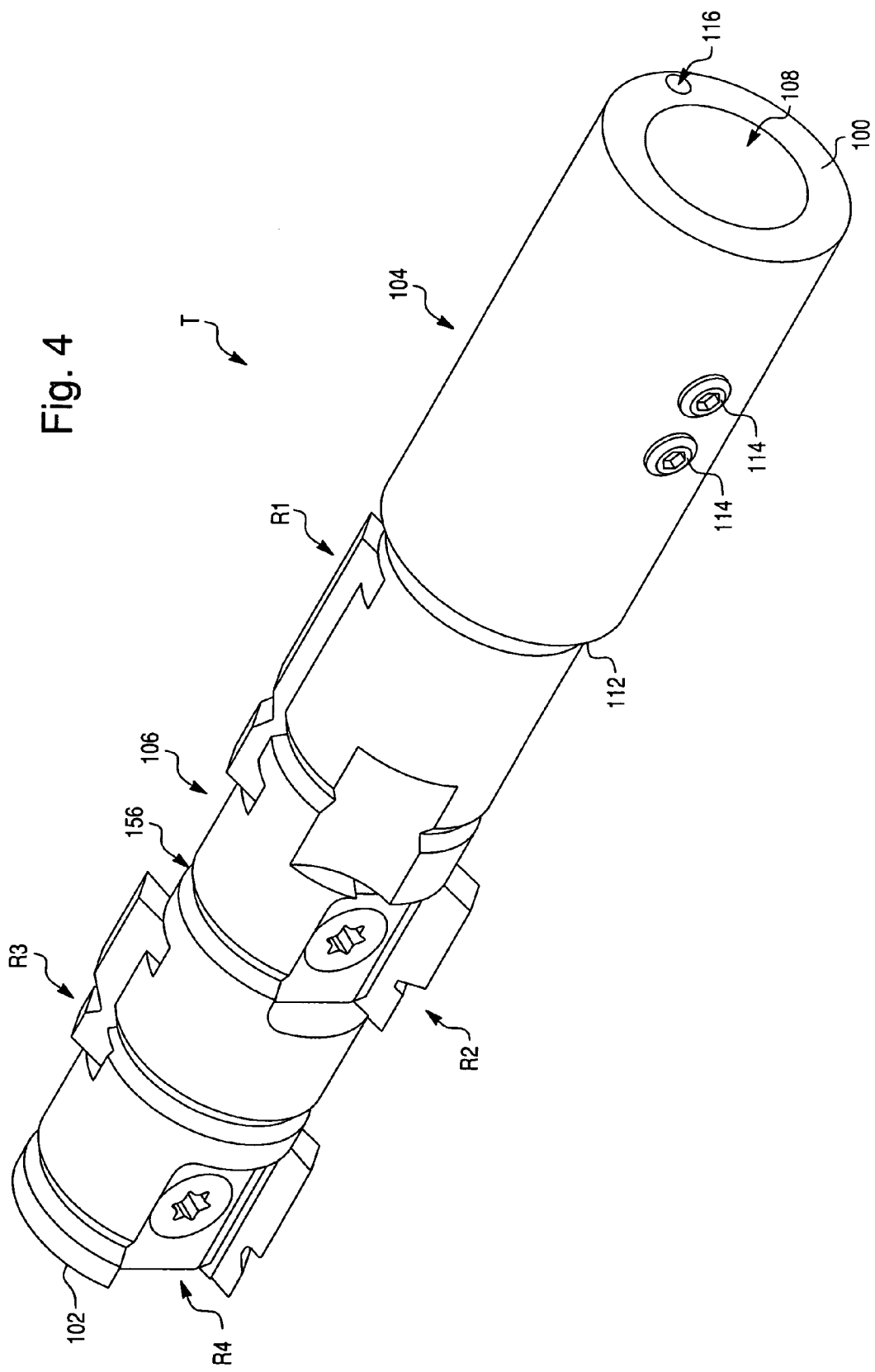

MULTI-BLADE ROUTER TOOL, EDGER WITH MULTI-BLADE ROUTER TOOL, AND METHOD OF EDGING EYEGLASS LENSES

FIELD OF THE INVENTION

The present invention relates to a router tool for edging the peripheral edge of eyeglass lenses. The tool comprises a longitudinally extending body rotatable on the axis thereof. A first blade extends axially and radially from the body, and has a first cutting portion for shaping an edge of a lens to a first configuration. A second blade is provided that is axially spaced from the first blade. The second blade extends axially and radially from the body, and has a second cutting portion for shaping an edge of a lens to a second configuration different than the first configuration. The present invention also relates to an edger having the disclosed router tool, and a method for shaping the edge of eyeglass lenses.

BACKGROUND OF THE INVENTION

Prescription eyeglass lenses are curved in such a way that light is correctly focused onto the retina of a patient's eye, improving vision. Such lenses are formed from glass or plastic lens "blanks" having certain desired properties to provide the correct prescription for the patient. The blanks are usually circular and of substantially larger dimension, for example 70 mm in diameter and 10 mm thick, compared to the relatively smaller finished lenses assembled into eyeglass frames. Therefore, a lens blank must be edged to fit an eyeglass frame selected by the patient.

Ophthalmic laboratory technicians cut, grind, edge, and polish blanks according to prescriptions provided by dispensing opticians, optometrists, or ophthalmologists. In addition, the large diameter blank is sized and shaped to fit into the frame selected by the patient. The lens blank may be shaped using an edger, such as the lens edger disclosed in U.S. Pat. No. 6,203,409 to Kennedy et al., the disclosure of which is incorporated herein by reference. The blank is edged so that the periphery of the finished lens fits the frame.

As known in the art, edging of a lens blank typically requires the application of a block to a surface thereof. The block is releasably secured to a clamp assembly, so that rotation of the clamp assembly causes corresponding rotation of the lens blank. The periphery of the blank is cut to the desired size using a router tool. The periphery may also be polished using a polishing tool. A bevel is often formed about the periphery of the lens, particularly adjacent the wearer. A combination tool incorporating a router and polishing hub may be used, as disclosed in the '409 patent.

The finished lens may then be assembled with the selected eyeglass frames. The frames include two spaced openings in which the finished lenses are mounted. The frame openings frequently have a bevel or a tongue, which interlocks with a complementarily shaped bevel or groove, respectively, formed about the peripheral edge of the lens. The interlock between the complementary bevel and groove helps to secure the lens within the opening of the frames. The router and polishing tools on the edger form the bevel or groove about the lens.

The configuration of the bevel or groove that is edged into the peripheral edge of the lens may vary depending on the configuration of the bevel or tongue in the frame openings. Therefore, various router and polishing tools are provided for forming different bevel or groove configurations. The router and polishing tools are interchangeably secured on the edger via a shaft and chuck assembly. Thus, the technician must change the tool each time a different bevel or groove is needed.

SUMMARY OF THE INVENTION

The present invention relates to a router tool for edging the peripheral edge of eyeglass lenses. In one embodiment, the router tool comprises a longitudinally extending body rotatable on the axis thereof. A first blade extends axially and radially from the body. The first blade has a first cutting portion for shaping an edge of a lens to a first configuration. A second blade is provided that is axially spaced from the first blade. The second blade extends axially and radially from the body, and has a second cutting portion for shaping an edge of a lens to a second configuration different than the first configuration.

In another embodiment, a router tool for edging the peripheral edge of a lens comprises a longitudinally extending body rotatable on the axis thereof. The body includes a proximal portion for securing to a shaft and a distal portion having at least first and second recesses formed therein. A first blade is releaseably secured within the first recess with a mounting bracket and fastener. The first blade extends axially and radially from the body, and has a first cutting portion for shaping an edge of a lens to a first configuration. A second blade is releaseably secured within the second recess with a mounting bracket and fastener. The second blade is radially and axially spaced from the first blade, and extends axially and radially from the body. The second blade has a second cutting portion for shaping an edge of a lens to a second configuration different than the first configuration.

The present invention also relates to an edger for shaping an edge of an eyeglass lens. The edger comprises a first table moveable in a first direction, and a first drive motor for controllably moving the first table in the first direction. A lens clamping and rotating assembly is secured to the first table and moveable therewith. The rotating assembly controllably rotates a lens about a first axis extending generally transverse to the first direction. A second table moveable in a second direction perpendicular to the first direction and parallel to the first axis is provided. A second drive motor controllably moves the second table in the second direction. A router tool is mounted to the second table and moveable therewith. The router tool rotates on a second axis parallel to the first axis. The tool comprises a longitudinally extending body, a first blade extending axially and radially from the body, and a second blade axially spaced from the first blade and extending axially and radially from the body. The first blade has a first cutting portion for shaping an edge of a lens to a first configuration. The second blade has a second cutting portion for shaping an edge of a lens to a second configuration different than the first configuration. A high-speed motor rotates the tool at a speed of up to 20,000 RPM.

An edger for shaping an edge of an eyeglass lens according to another embodiment is also disclosed. The edger includes a base plate, first and second tables, a lens clamping and rotating assembly and a router tool. The first table is secured to the base plate and moveable in a first direction. A first drive motor controls movement of the first table in the first direction. The second table is secured to the first table and moveable in a second direction perpendicular to the first direction. A second drive motor controls movement of the second table in the second direction. The lens clamping and rotating assembly is secured to the second table and moveable therewith. The rotating assembly controls rotation of a lens about a first axis extending generally parallel to the first direction and perpendicular to the second direction. The router tool is mounted to the base plate, and rotates on a second axis parallel to the first axis. The tool comprises a longitudinally extending body, a first blade extending axially and radially from the body, the first blade having a first cutting portion for shaping an edge of the lens to a first configuration, and a second blade axially spaced from the first blade. The second blade extends axially and radially from the body, the second blade having a second cutting portion for shaping an edge of the lens to a second configuration different than the first configuration. A high-speed motor rotates the tool at a speed of up to 20,000 RPM.

The present invention is also directed to a method for edging an edge of an eyeglass lens. A lens blank having a peripheral edge is provided. A router tool is provided. The router tool has at least a first blade with a first cutting portion for shaping the edge of the blank to a first configuration, and a second blade having a second cutting portion for shaping the edge of the blank to a second configuration different than the first configuration. The blank is rotated about its geometric axis. One of the first and second blades for shaping the edge of the blank is selected, and the edge of the lens is engaged with the selected blade as the router tool rotates up to 20,000 RPM. The edge of the lens is thereby shaped to one of the first and second configurations corresponding to the selected blade.

BRIEF DESCRIPTION OF THE FIGURES

FIG. 4 is a perspective view of a router tool according to an embodiment of the present invention;

DETAILED DESCRIPTION OF THE INVENTION

Figure 1:
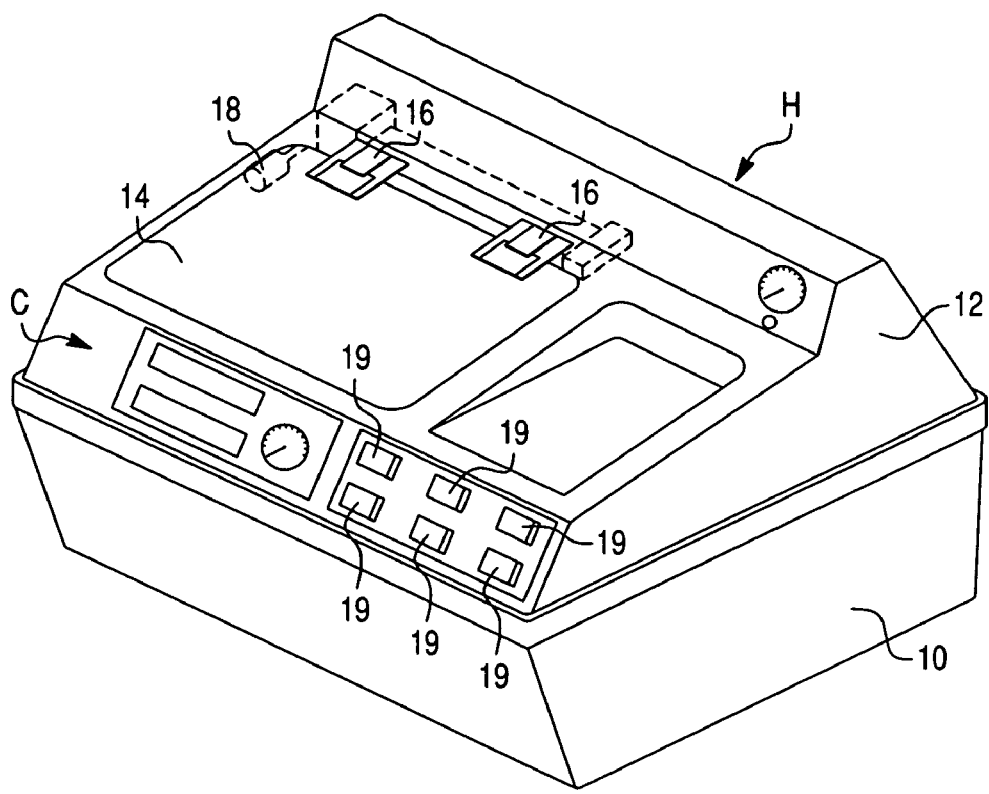
FIG. 1 is a perspective view of the housing of an edger according to a first embodiment of the present invention.

As best shown in FIG. 1, an edger H according to a first embodiment of the present invention includes a housing, which encloses the components while permitting operator access to the controls C. The housing includes a lower housing portion 10 to which upper housing portion 12 is hingedly connected. Upper portion 12 has a window 14 which may be opened by means of hinges or slides 16 to permit operator access to the interior of the housing. A switch 18 may be secured to window 14 and pivotal therewith, for preventing operation of edger H while window 14 is in the raised, or open, position. Control panel C is mounted to upper portion 12 and provides access by the technician to various controls, collectively 19, of edger H.

Figure 2:
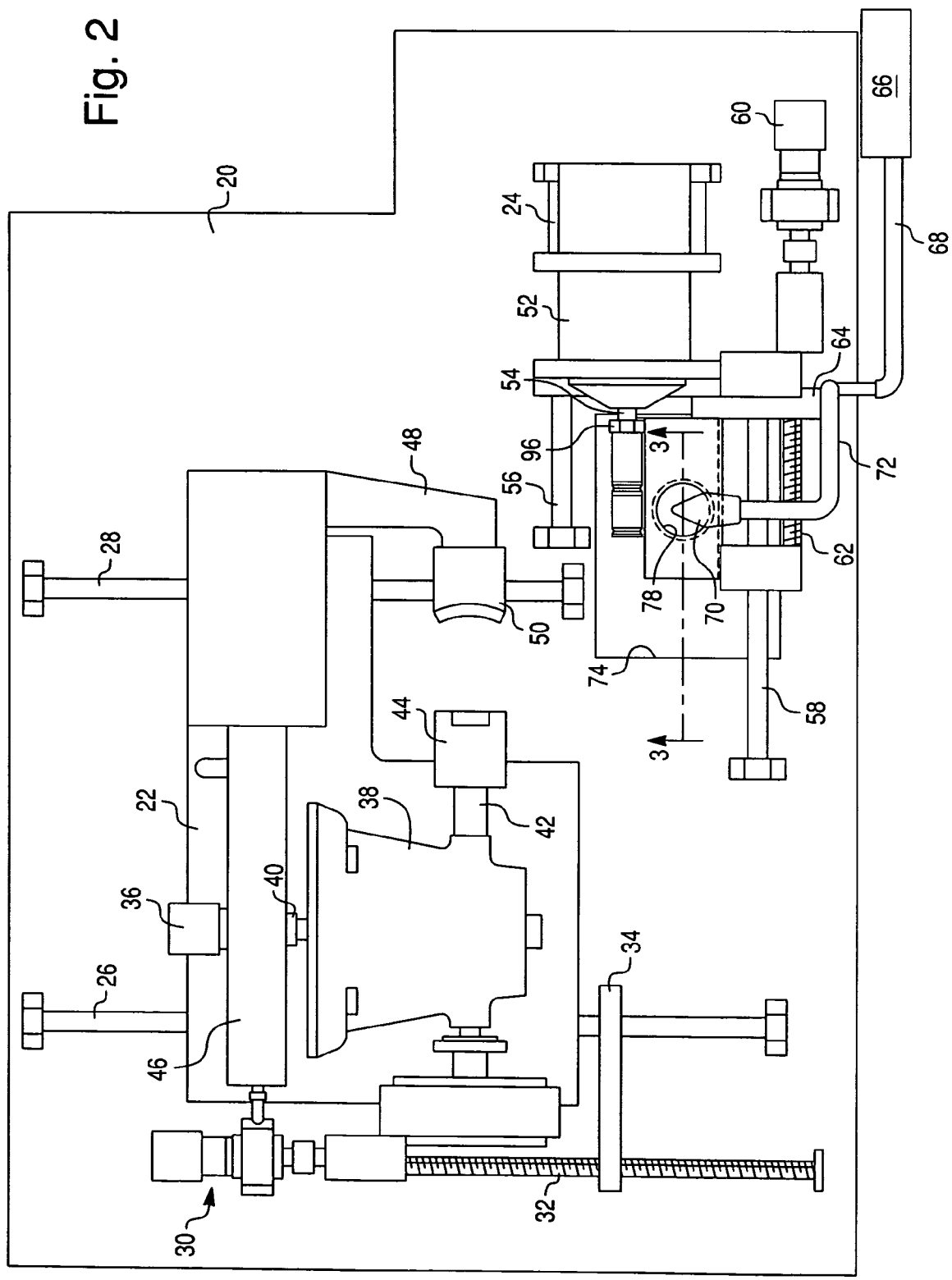
FIG. 2 is a plan view, partially in schematic, of the edger of the first embodiment.

As best shown in FIG. 2, edger H includes a base plate 20 within the housing, to which tables 22 and 24 are mounted for movement perpendicular to each other. Rails 26 and 28 are secured to base 20 and extend in parallel in a first direction relative to base 20. First table 22 is slidably mounted to rails 26 and 28 for movement therealong in the first direction. Servomotor drive 30 is mounted to base 20 adjacent rail 26, and is operably connected to rotary screw 32 for causing controlled rotation thereof. Bracket 34 is secured to first table 22 along the forward edge thereof. Bracket 34 incorporates a ball nut threadedly engaged with rotary screw 32, so that rotation of screw 32 causes corresponding displacement of the ball nut and hence of bracket 34 and table 22.

Servomotor drive 36 is mounted to and carried by table 22, and is operably connected to transmission 38 through motor coupling 40. Shaft 42 extends from transmission 38 in a direction transverse to the first direction defined by rails 26 and 28. Shaft 42 is controllably rotated with precision because of servomotor drive 36 acting through transmission 38. Clamp assembly 44 is secured to the end of shaft 42, and is rotatable therewith. Clamp assembly 44 is adapted for engagement with an edging block removably secured to a lens blank to be edged.

Pneumatic lens clamp cylinder 46 is secured to first table 22 above drive 36, and the extensible piston thereof is operably engaged with arm 48 for causing movement thereof. Arm 48 carries second clamp assembly 50, which is adapted for engaging a lens blank. Actuation of clamp cylinder 46 by the technician through one of the controls 19 causes displacement of clamp assembly 50 either toward or away from clamp assembly 44, thereby clamping or releasing a blocked lens blank. As known in the art, a block is releasably secured to clamp assembly 44, so that rotation of clamp assembly 44 by shaft 42 causes corresponding rotation of the blocked lens blank about the axis of shaft 42.

High speed motor 52 is mounted to second table 24, and has a rotary shaft 54. The motor 52 preferably rotates shaft 54 at a speed of up to 20,000 rpm. A router tool T is mounted to shaft 54, and is rotatable therewith in order for edging the lens blank.

Rails 56 and 58 are secured to base 20 and extend in a second direction perpendicular to the first direction defined by rails 26 and 28. Second table 24 is slidably mounted to the rails 56 and 58 for movement in the second direction defined thereby. Servomotor drive 60 is secured to base 20, and drives rotary screw 62. Bracket 64 is secured to second table 24 and has a ball nut threadedly engaged with screw 62, so that rotation of screw 62 by motor 60 will cause corresponding displacement of bracket 64 and hence of second table 24. Because of the precision control provided by servomotor drive 60, rotary screw 62, and the ball nut of bracket 64, precise positioning of tool T relative to a lens blank clamped between and rotated by clamp assemblies 44 and 50 is achieved in order to permit the edging process to proceed.

A water supply 66 may be operably associated with base 20. A supply line 68 leads to a spray nozzle 70, which is secured to bracket 64 by tubing or light pipe 72, and maintains orientation of nozzle 70 relative to tool T as second table 24 slides on the rails 56 and 58. Those skilled in the art will appreciate that pumps and pressure controls are provided in conjunction with water supply 66 so that there is adequate water pressure for droplet formation by nozzle 70.

Figure 3:
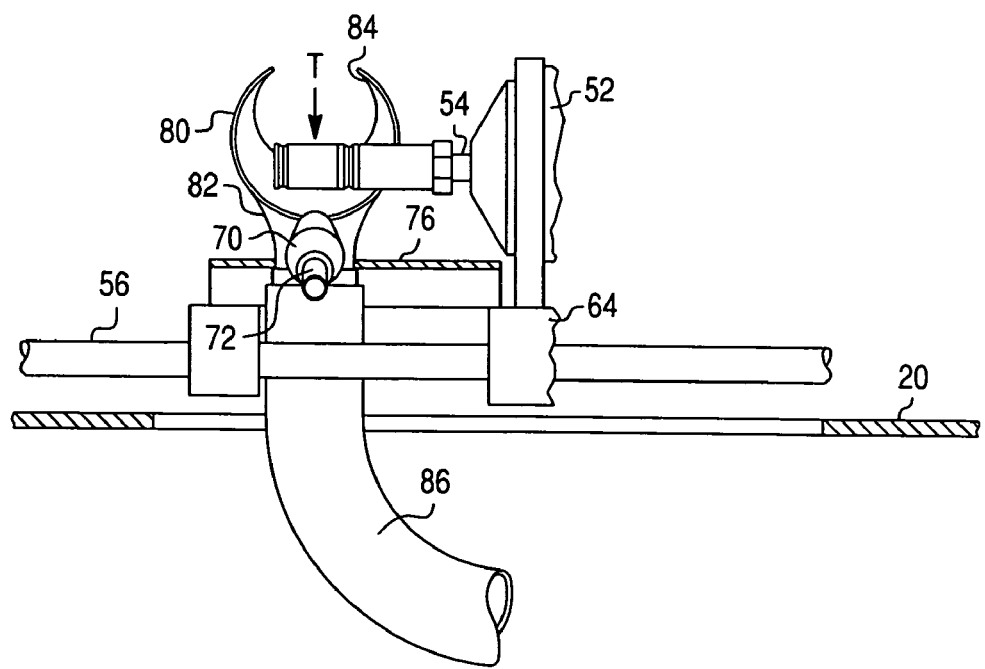
FIG. 3 is a fragmentary elevational view taken along line 3—3 of FIG. 2 and viewed in the direction of the arrows.

As best shown in FIGS. 2 and 3, a rectangular opening 74 may be formed in base 20. A chip chute 76 is mounted to table 24 through brackets or the like, and defines a plate partially closing opening 74. Aperture 78 is formed in chip chute 76 below tool T. A cowl 80 has a duct-like portion 82 fitted within aperture 78 of chip chute 76. Cowl 80 has a slot 84 providing an opening adjacent tool T for permitting a lens blank clamped between assemblies 44 and 50 to be brought into engagement with tool T through operation of servomotor drive 30. Vacuum line 86 is secured to duct 82 below chip chute 76 for applying a vacuum to cowl 80. Vacuum line 86 terminates at a vacuum source, and causes air, particulates, and water mist to be drawn through cowl 80 to the vacuum source. Because of opening 74, vacuum line 86 is permitted to move with table 24 as the table moves in response to operation of servomotor drive 60.

Figure 3A:
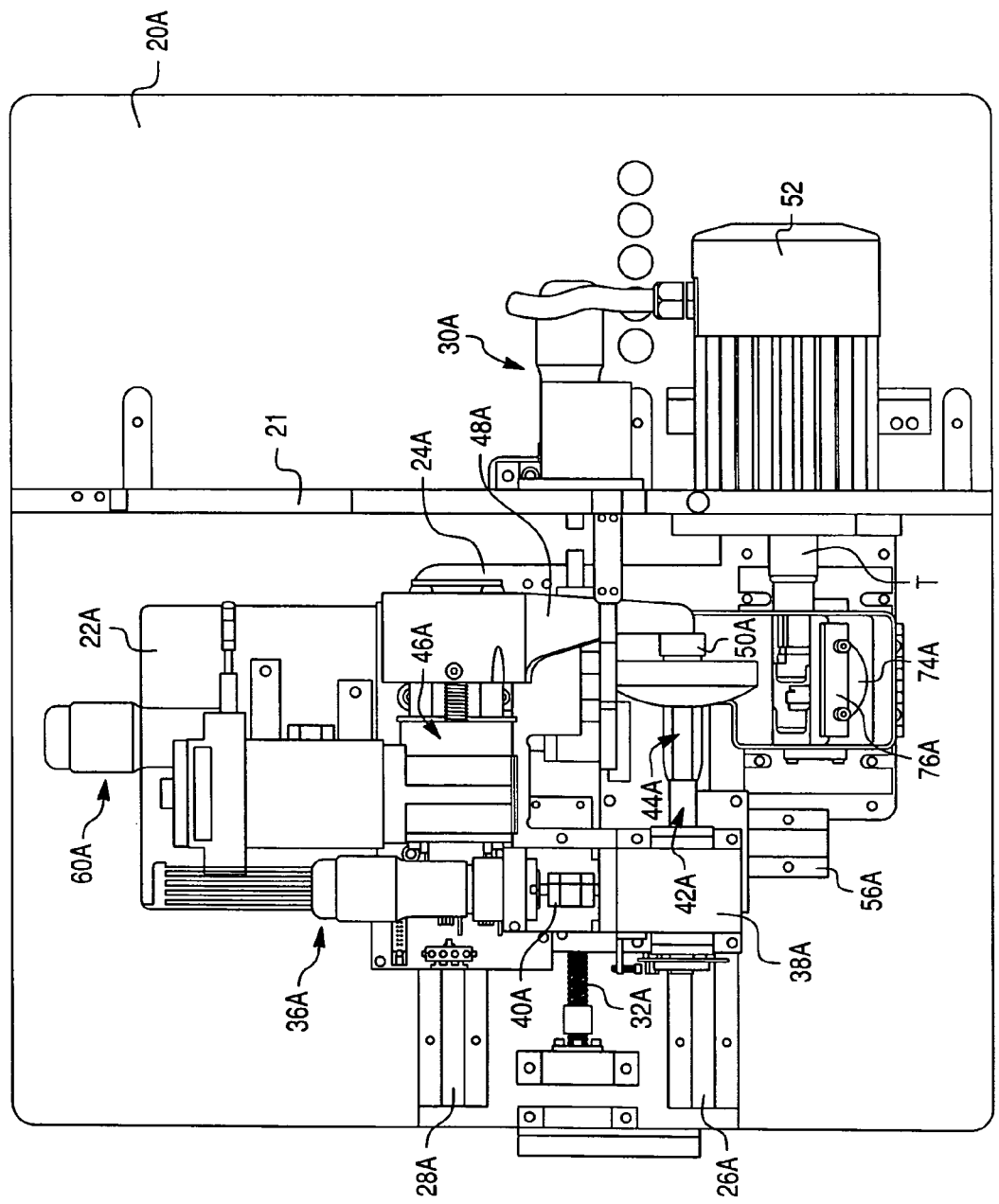
FIG. 3A is a plan view, partially in schematic, of an edger according to a second embodiment.

An edger H2 according to a second embodiment is best shown in FIG. 3A. Some components of edger H2 are identical to components of edger H, and are identified with like reference numerals. Edger H2 may include a lower housing portion 10 and upper housing portion 12 as described above, and as shown in FIG. 1.

As best shown in FIG. 3A, edger H2 includes a base plate 20A within the housing. Preferably, base 20A includes a wall 21 extending outwardly from and perpendicular to base 20A. High speed motor 52 is mounted directly to base 20A, and may be mounted to wall 21 using brackets or the like. Wall 21 includes an opening through which rotary shaft 54 extends (not shown). Motor 52 preferably rotates shaft 54 at a speed of up to 20,000 rpm. Router tool T is mounted to shaft 54 as described above. As in the first embodiment, a water supply may be operably associated with base 20A proximate router tool T, including a supply line and spray nozzle.

A first plate 22A is mounted on base 20A via rails 26A, 28A. Rails 26A, 28A are secured to base 20A and extend in parallel in a first direction relative to base 20A. Plate 22A is slidably mounted to rails 26A, 28A for movement therealong in a first direction. Servomotor drive 30A is mounted to base 20A, and is operably connected to rotary screw 32A for causing controlled rotation thereof. Servomotor drive 30A may be mounted to wall 21 adjacent motor 52, in which case wall 21 includes an opening through which rotary screw 32A extends. First plate 22A includes a bracket (not shown) that engages rotary screw 32A so that rotation of screw 32A causes movement of first plate 22A along rails 26A, 28A.

A second plate 24A is secured to first plate 22A via rails 56A, 58A (rail 58A is not shown). Rails 56A, 58A are secured to first plate 22A and extend parallel to each other in a second direction perpendicular to the first direction defined by rails 26A, 28A. Second plate 24A is slidably mounted to rails 56A, 58A for movement in the second direction defined thereby. Preferably, rails 56A, 58A lie on a plane spaced from the plane of rails 26A, 28A so that movement of first and second plates 22A, 24A in the first and second directions is not hindered by rails 26A, 28A and 56A, 58A. Servomotor drive 60A is secured to first plate 22A, and drives a rotary screw (not shown). A bracket is secured to second plate 24A which engages the rotary screw so that rotation of the screw by motor 60A causes movement of second plate 24A along rails 56A, 58A.

A servomotor drive 36A is mounted to and carried by second plate 24A, and is operably connected to a transmission 38A through a motor coupling 40A. A shaft 42A extends from transmission 38A in a direction parallel to the first direction defined by rails 26A, 28A. Shaft 42A is controllably rotated with precision by servomotor drive 36A acting through transmission 38A. As in the first embodiment, a clamp assembly 44A is secured to the end of shaft 42A, and is rotatable therewith. Clamp assembly 44A is adapted for engagement with an edging block removably secured to a lens blank to be edged.

An electric lens clamp cylinder 46A is secured to second plate 24A adjacent drive 36A, and the extensible piston thereof is operably engaged with arm 48A for causing movement thereof. Arm 48A carries second clamp assembly 50A, which is adapted for engaging a lens blank. Actuation of clamp cylinder 46A by the technician through one of the controls causes displacement of clamp assembly 50A either toward or away from clamp assembly 44A, thereby clamping or releasing a blocked lens blank.

An opening 74A may be formed in base 20A. A chip chute 76A is mounted to base 20 with brackets or the like, and defines a plate partially covering opening 74A. Chip chute 76A may be similar to chip chute 76 in configuration, and a detailed description of same will not be repeated. Similarly, a vacuum line may be provided below chip chute 76A and mounted on base 20A, which causes air, particulates, and water mist to be drawn through an associated cowl to the vacuum source.

Figure 5:
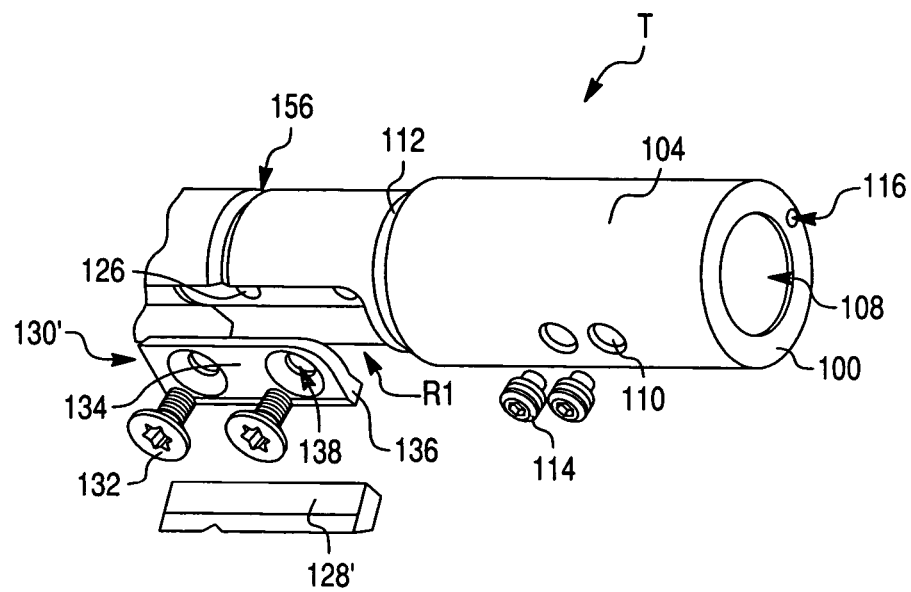
FIG. 5 is a fragmentary perspective view of the router tool with an exploded assembly view of a cutter assembly.
Figure 6:
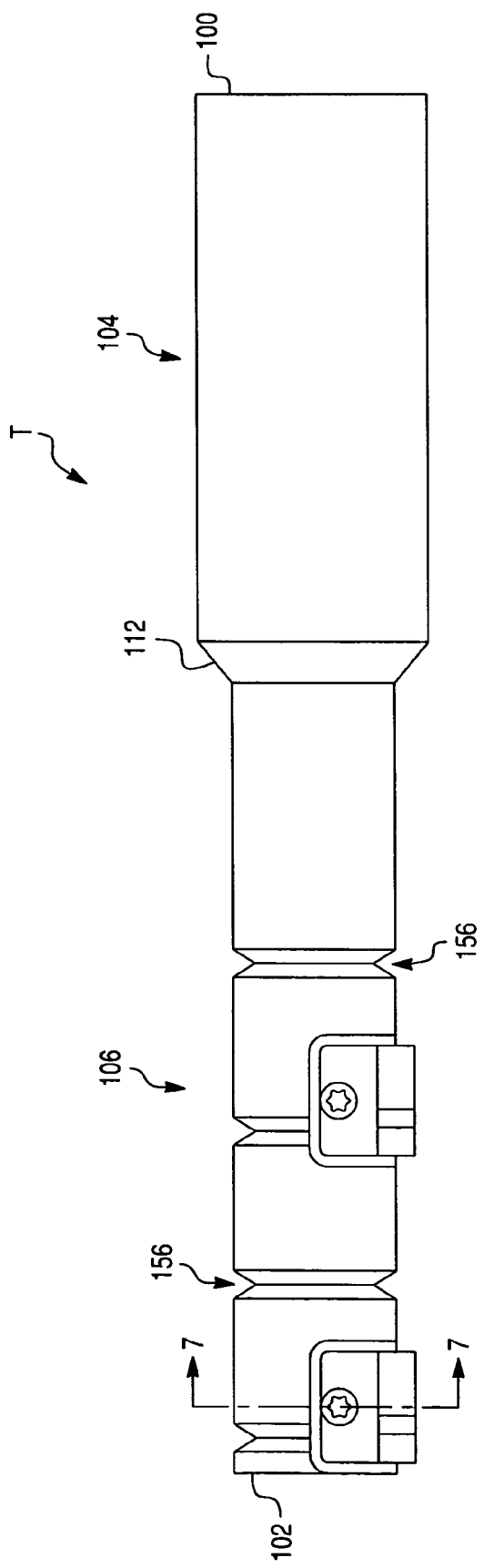
FIG. 6 is a side view of the router tool shown in FIG. 4.

Referring now to FIGS. 4–7, tool T includes a longitudinally extending body, which is generally cylindrical in configuration and rotatable on the axis thereof. As best shown in FIGS. 4 and 6, tool T includes first and second opposing ends 100, 102. A proximal portion 104 is proximate first end 100, and a distal portion 106 is proximate second end 102. The diameter of distal portion 106 may be slightly less than the diameter of proximal portion 104. Tool T may be manufactured from grade 303 stainless steel.

Proximal portion 104 includes a coaxially extending bore 108 extending inwardly from first end 100 into proximal portion 104, as best shown in FIGS. 4 and 5. Bore 108 is configured to receive shaft 54 therein. In addition, threaded openings 110 extend into proximal portion 104 intermediate first end 100 and an interface 112 between proximal portion 104 and distal portion 106. Interface 112 is preferably angled from proximal portion 104 to distal portion 106, as best shown in FIG. 6. Threaded openings 110 extend inwardly through proximal portion to bore 108, preferably extending perpendicularly to bore 108. Threaded fasteners 114 may be screwed into threaded openings 110, so that the leading end of fasteners 114 protrude into bore 108.

Tool T may be releasably secured to shaft 54 on edger H by sliding shaft 54 into bore 108. Fasteners 114 are then screwed into openings 110 so that the leading ends of fasteners 114 are tightened against shaft 54, thereby releasably securing tool T to shaft 54. However, it would be apparent to one skilled in the art that tool T may be secured to shaft 54 using other securing means, such as a clamp or bolts. Alternatively, bore 108 may be threaded for engaging a corresponding threaded shaft (not shown).

As best shown in FIGS. 4 and 5, proximal portion 104 may also include a second coaxially extending bore 116 extending inwardly from first end 100 into proximal portion 104, and spaced from and parallel to bore 108. Second bore 116 may be provided so that tool T is balanced when tool T is axially rotated. Second bore 116 typically has a diameter substantially less than the diameter of bore 108. However, it should be understood that the exact dimensions of second bore 116 may vary depending on the overall configuration of tool T.

Figure 7:
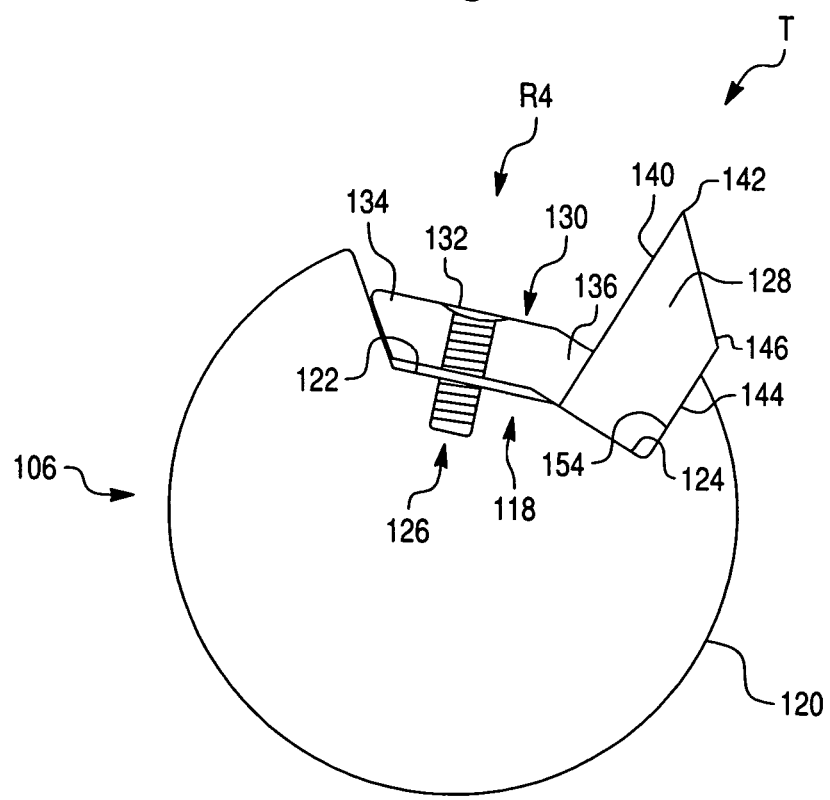
FIG. 7 is a cross-sectional view taken along line 7—7 of FIG. 6 and viewed in the direction of the arrows.

Distal portion 106 includes a plurality of axially spaced recesses R1, R2, R3, R4, as best shown in FIGS. 4–7. Recesses R1–R4 are also preferably radially spaced from each other. As best shown in FIG. 7, recess R4 includes a base 118 inwardly disposed relative to an outer surface 120 of distal portion 106. Each base 118 has a first portion 122 and a second portion 124. Preferably, first portion 122 lies on a plane that is angularly disposed relative to the plane of second portion 124. First portion 122 includes a threaded bore 126 extending into distal portion 106. Recesses R2–R4 also include bases 118 with first and second portions 122, 124. Recess R1 may include two threaded bores 126, as best shown in FIG. 5.

Each recess R1, R2, R3, R4 is configured to receive a corresponding cutter assembly. As best shown in FIGS. 5 and 7, each cutter assembly includes a blade 128, a mounting bracket 130, and a threaded mounting screw 132. Preferably the cutter assembly positioned in recess R1 includes two mounting screws 132, as best shown in FIG. 5. Each mounting bracket 130 is received within a corresponding recess R1–R4, and secured therein with mounting screw 132.

Mounting bracket 130 includes a major portion 134 and a leg 136 angularly disposed relative to major portion 136. Major portion 134 has an opening 138, through which the threaded portion of mounting screw 132 may be passed. Preferably, the cutter assembly positioned in recess R1 includes a mounting bracket 130' having two openings 138, as best shown in FIG. 5.

As best shown in FIGS. 7–10, each blade 128 includes a first side 140 having a cutting edge 142, a second side 144, and a sloped portion 146 extending downwardly from cutting edge 142 to second side 144. Cutting edge 142 may have any desired configuration, depending on the desired shape to be formed in the perimeter of the lens blank during the edging operation.

Figure 8:
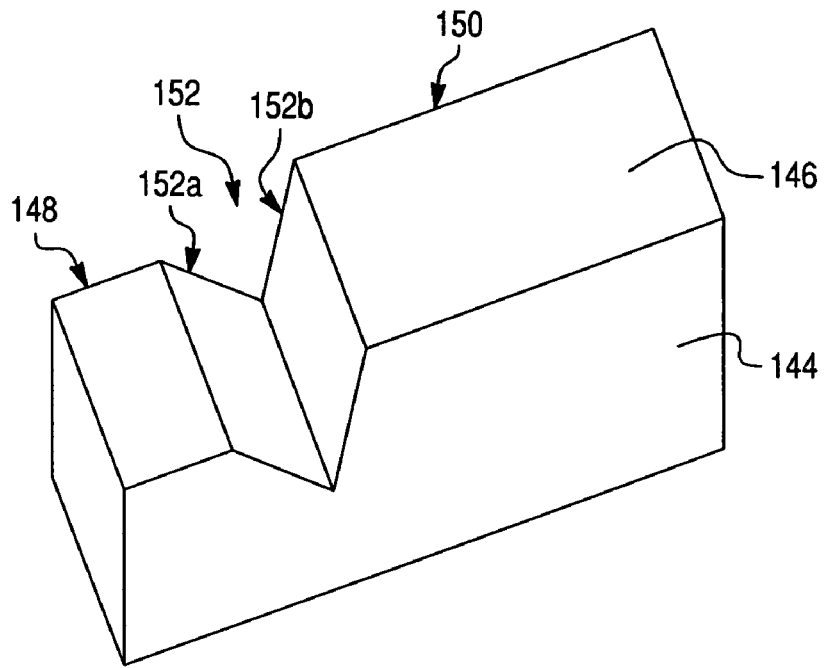
FIG. 8 is a perspective view of a blade according to one embodiment.

As best shown in FIG. 8, cutting edge 142 may include a first edge 148, a second edge 150 spaced from first edge 148, and a contoured edge 152 intermediate and integral with first and second edges 148, 150. First and second edges 148, 150 may be either coplanar, or they may lie on planes that are spaced from each other.

Contoured edge 152 may be V-shaped, with first and second sides 152a, 152b, as best shown in FIG. 8. First side 152a may extend from first edge 148 at a first angle, and second side 152b may extend from second edge 150 at a second angle different than the angle of first side 152a, or they may extend at the same angle.

Figure 9:
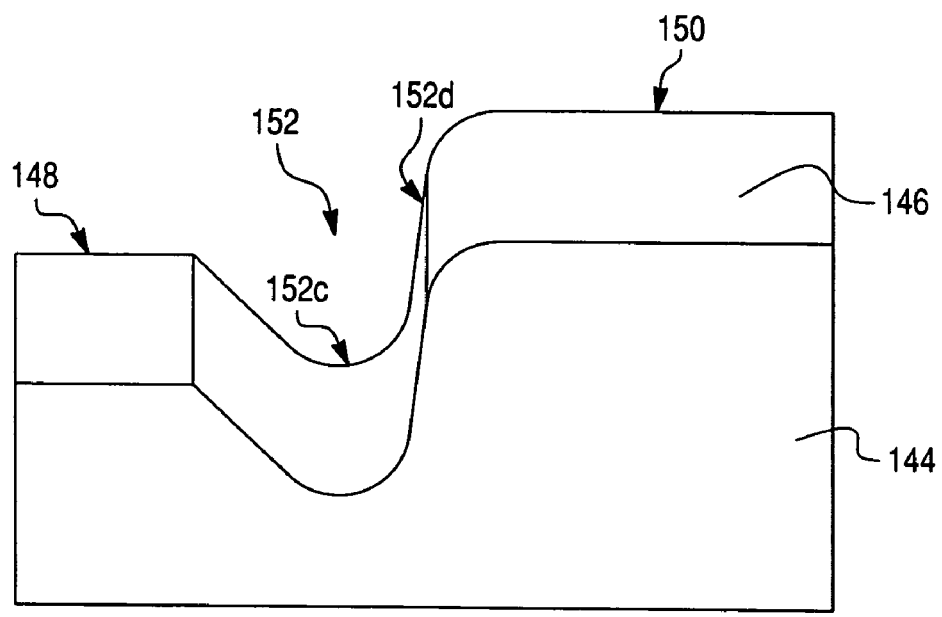
FIG. 9 is a perspective view of a blade according to another embodiment.

Contoured edge 152 may include a portion 152c having an arcuate profile, as best shown in FIG. 9. Contoured edge 152 may also include a portion 152d that is substantially perpendicular to first or second edge 148, 150.

Figure 10:
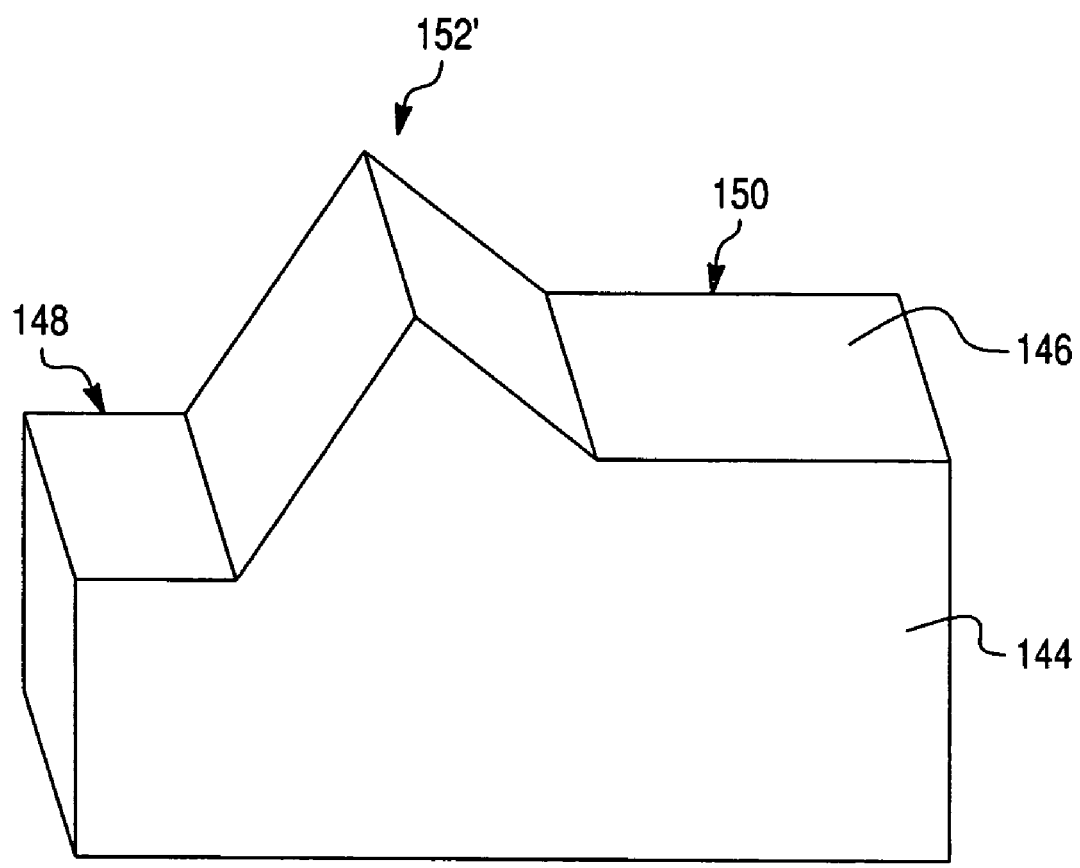
FIG. 10 is a perspective view of a blade according to another embodiment.

Cutting edge 142 may also include a contoured edge 152' that extends outwardly relative to first and second edges 148, 150, as best shown in FIG. 10. It will be understood to one skilled in the art that cutting edges 148, 150, 152 (or 152') may have any configuration for forming a desired shape of the perimeter of the lens blank. Therefore, the configurations of blades 128 shown in FIGS. 4–10 are for purposes of explanation only, and the present invention is not so limited.

The configuration of edges 148, 150, 152 is a mirror image of the edge that will be formed on the perimeter of the lens blank. For example, the inwardly extending V-shaped contoured edge 152 shown in FIG. 8 will form an outwardly extending V-shaped bevel about the perimeter of a lens.

Blade 128 is positioned in one of recesses R1–R4 so that second side 144 of blade 128 abuts a first wall 154, as shown in recess R4 in FIG. 7. Blade 128 extends axially and radially from outer surface 120 of distal portion 106. Mounting bracket 130 is also positioned in recess R4, with opening 138 aligned with threaded bore 126 in first portion 122 of base 118, and leg 136 adjacent first side 140 of blade 128.

The threaded portion of mounting screw 132 passes through opening 138, and may be screwed into threaded bore 126. Because of the angular configuration of leg 136, leg 136 is forced against first side 140 of blade 128, and tensioned against first side 140 as mounting screw 132 is tightened into bore 126. In this way, mounting bracket 130 and blade 128 are securely fastened to distal portion 106. Blade 128 may be easily removed and replaced by simply loosening mounting screw 132, thereby loosening leg 136 from first side 140 of blade 128.

Similarly, blades 128 may be secured within recesses R1–R3. However, recess R1 is preferably configured to receive a blade 128' having a longer second edge 150 compared to blades 128 secured within recesses R2–R4. A lens blank may be edged without forming a contoured perimeter on the blank by using the longer second edge 150 of blade 128'. The blank may be edged to a size that is slightly larger than the desired final size and shape using only second edge 150 of blade 128'. Then, the blank may be edged to have a bevel, groove, or other contoured configuration using edges 148, 150, 152 of one of blades 128 in recesses R2–R4. Of course, the lens blank may be edged without first using the longer second edge 150 of blade 128'. However, the edging process is faster if the size of the lens blank is first reduced to about its desired final size using only a planar cutting edge 150.

Preferably, each of blades 128 on tool T has a different configuration. In this way, tool T may be used for shaping lens blanks having peripheral edges with various configurations. Thus, a technician selects the cutting edge 142 of one of blades 128 that will form the desired configuration on the lens blank, but may use the same tool T. Previously, the technician was required to change the router tool each time a different bevel or groove was needed. In the present invention, tool T may be used to form four different configurations about the peripheral edge of lens blanks, thereby saving manufacturing time and cost. Of course, tool T may include more or fewer than four cutter assemblies, but preferably includes at least two cutter assemblies. Generally, the length of tool T will increase as additional cutter assemblies are provided on distal portion 106, given the cutter assemblies are axially spaced from each other. A permissible length for tool T may therefore be restricted by the amount of space for the router tool in the edger being used.

Tool T may include grooves 156 formed peripherally about distal portion 106, wherein a groove is aligned with each contoured edge 152, as best shown in FIGS. 4–6. When blade 128 is installed and/or replaced, the technician simply lines up contoured edge 152 with the corresponding groove 156. Grooves 156 permit the contoured edges 152, and therefore blades 128, to be precisely oriented relative to distal portion 106.

It will be apparent to one of ordinary skill in the art that various modifications and variations can be made in construction or configuration of the present invention without departing from the spirit of the invention. Therefore, it is intended that the present invention include all such modifications or variations, provided they come within the scope of the following claims and their equivalents.

I claim:

1. A router tool for edging the peripheral edge of eyeglass lenses, comprising:

a longitudinally extending body rotatable on the axis thereof;

a first blade extending axially and radially from said body, said first blade having a first cutting portion for shaping an edge of a lens to a first configuration; and a second blade axially spaced from said first blade, said second blade extending axially and radially from said body, said second blade having a second cutting portion for shaping an edge of a lens to a second configuration different than said first configuration, wherein each of said first and second cutting portions extend axially from said body, and each of said first and second cutting portions include a first edge, a second edge spaced from said first edge, and a contoured edge integral with and intermediate said first and second edges, said first and second edges lying on a plane parallel to the axis of said body; and a groove formed peripherally about said body and aligned axially with said contoured edge.

2. The router tool of claim 1, wherein said first edge of at least one of said first and second cutting portions lies on a plane spaced from the plane of said second edge.

3. The router tool of claim 1, wherein said first edge of at least one of said first and second cutting portions is coplanar with said second edge.

4. The router tool of claim 1, wherein said contoured edge of at least one of said first and second cutting portions extends inwardly toward said body for forming a bevel about the edge of the lens.

5. The router tool of claim 4, wherein said contoured edge is V-shaped.

6. The router tool of claim 4, wherein said contoured edge includes a first side adjacent said first edge and a second side adjacent said second edge.

7. The router tool of claim 6, wherein said first side is planar.

8. The router tool of claim 7, wherein said first side extends at a first angle, and said second side extends at a second angle differing from said first angle.

9. The router tool of claim 8, wherein said second side is substantially perpendicular to said second edge.

10. The router tool of claim 6, wherein said first side is arcuate.

11. The router tool of claim 1, wherein said contoured edge of at least one of said first and second cutting portions extends outwardly relative said first and second edges for forming a groove about the edge of the lens.

12. The router tool of claim 1, wherein said groove is V-shaped.

13. The router tool of claim 1, wherein said body is generally cylindrical.

14. The router tool of claim 1, wherein said body includes a proximal portion for securing to a shaft and a distal portion.

15. The router tool of claim 14, wherein said proximal portion includes a coaxially extending bore extending from a first end into said proximal portion, said shaft releaseably securable within said bore.

16. The router tool of claim 14, wherein said distal portion includes at least two recesses, each recess having a base and first and second sidewalls.

17. The router tool of claim 16, wherein each of said blades is releaseably securable in one of said recesses.

18. The router tool of claim 17, wherein said base includes a first portion lying on a first plane, and a second portion angularly disposed relative to the plane of said first portion.

19. The router tool of claim 18, wherein said blade is removeably secured in said second portion using a mounting bracket and fastener.

20. The router tool of claim 19, wherein said first portion includes a threaded bore for receiving said fastener and securing said mounting bracket thereto.

21. The router tool of claim 20, wherein said mounting bracket includes an opening for passing a threaded portion of said fastener therethrough and into said threaded bore.

22. The router tool of claim 19, wherein said mounting bracket includes a major portion and a leg angularly disposed relative to said major portion.

23. The router tool of claim 22, wherein a first side of one of said blades is positioned against said first sidewall of said recess, and said leg is releaseably tensioned against a second side of said blade opposite said first side for securing said blade therein.

24. The router tool of claim 1, wherein said first blade is radially spaced from said second blade.

25. The router tool of claim 1, further comprising at least a third blade axially spaced from said first and second blades, said third blade extending axially and radially from said body, said third blade having a third cutting portion for shaping an edge of a lens to a third configuration different than said first and second configurations.

26. The router tool of claim 25, wherein said first, second and third blades are radially spaced from each other.

* * * * *